United States Patent
Bazawada et al.

(10) Patent No.: US 11,164,466 B2
(45) Date of Patent: Nov. 2, 2021

(54) SYSTEMS AND METHODS FOR DETECTING AND REPRESENTING TRAFFIC MANEUVERS ON DISPLAYS

(71) Applicant: HONEYWELL INTERNATIONAL INC., Morris Plains, NJ (US)

(72) Inventors: Suresh Bazawada, Karnataka (IN); Anil Kumar Songa, Karnataka (IN); Vasudev Prakash Shanbhag, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 333 days.

(21) Appl. No.: 16/365,307

(22) Filed: Mar. 26, 2019

(65) Prior Publication Data
US 2020/0312164 A1   Oct. 1, 2020

(51) Int. Cl.
G08G 5/00 (2006.01)
G06F 3/0481 (2013.01)
G06F 3/0484 (2013.01)

(52) U.S. Cl.
CPC ......... *G08G 5/0073* (2013.01); *G06F 3/0484* (2013.01); *G06F 3/04817* (2013.01)

(58) Field of Classification Search
CPC ............. G05D 1/0676; G01C 21/3415; G08G 5/0073; G06F 3/04817; G06F 3/0484
USPC ...................................................... 701/120
See application file for complete search history.

(56) References Cited

U.S. PATENT DOCUMENTS

| | | | |
|---|---|---|---|
| 5,225,829 A * | 7/1993 | Bateman | G05D 1/0676 244/181 |
| 5,912,627 A * | 6/1999 | Alexander | G05D 1/0833 340/815.4 |
| 6,845,316 B2 | 1/2005 | Yates | |
| 7,714,744 B1 * | 5/2010 | Wichgers | G08G 5/045 340/965 |
| 8,234,020 B1 * | 7/2012 | Wichgers | G08G 5/0021 701/9 |
| 8,830,090 B2 | 9/2014 | Shafaat | |
| 9,105,183 B2 | 8/2015 | Samuthirapandian et al. | |
| 9,222,795 B1 * | 12/2015 | Gerlach | G01C 21/3415 |
| 9,557,416 B2 | 1/2017 | Samuthirapandian et al. | |
| 9,773,421 B2 | 9/2017 | Wang et al. | |
| 2002/0089432 A1 | 7/2002 | Staggs et al. | |

(Continued)

*Primary Examiner* — Gertrude Arthur Jeanglaude
(74) *Attorney, Agent, or Firm* — Lorenz & Kopf

(57) ABSTRACT

Systems and methods for detecting and representing traffic maneuvers are provided. The method includes receiving traffic information for a neighbor traffic. The method may use the neighbor traffic information to calculate a volume around the neighbor traffic, defined by min max thresholds related to the traffic information. The traffic information is monitored until the default time elapses, to thereby determine a delta latitudinal position, a delta longitudinal position, a delta altitude, a delta pitch, and a delta roll, of the neighbor traffic during the default time; and a traffic maneuver is identified upon the occurrence of one or more of (i) the delta latitudinal position exceeded the maximum latitudinal threshold, (ii) the delta longitudinal position exceeded the maximum longitudinal threshold, and (iii) the delta altitude exceeded the magnitude of the maximum altitude threshold. An enhanced symbolic indicator of the traffic maneuver is rendered on a map image.

20 Claims, 9 Drawing Sheets

(56) References Cited

U.S. PATENT DOCUMENTS

| | | | |
|---|---|---|---|
| 2008/0039988 A1* | 2/2008 | Estabrook | G08G 5/0056 |
| | | | 701/14 |
| 2009/0051570 A1 | 2/2009 | Clark et al. | |
| 2013/0006511 A1 | 1/2013 | Ramaiah et al. | |
| 2013/0009792 A1 | 1/2013 | Shafaat | |
| 2013/0113819 A1 | 5/2013 | Gurusamy | |

* cited by examiner

SYSTEMS AND METHODS FOR DETECTING AND REPRESENTING TRAFFIC MANEUVERS ON DISPLAYS

TECHNICAL FIELD

The technical field generally relates to navigational aids, and more particularly relates to systems and methods for detecting and representing traffic maneuvers on displays.

BACKGROUND

On a conventional cockpit display, the visual representation of in-air or on-ground traffic surrounding an ownship includes, for each neighbor traffic, a symbolic indicator (such as a triangle) to represent the traffic and convey the heading of the traffic. The symbolic indicator may be placed on a displayed map image at a location that represents its location with respect to the ownship. The triangle may be oriented to point in the direction of the heading of the traffic. Accordingly, the conventional displays assume the traffic heading and direction of movement are the same.

When the traffic heading does not predict the traffic movement, the conventional display can be inadequate. Additionally, conventional displays can be inadequate to depict traffic maneuvers in which the traffic may assume a variety of orientations in three dimensions. In some scenarios, the traffic may travel sideways, travel in reverse, travel upwards, travel downwards, and/or hover. For example, a basic fighter maneuver (BFM) is a tactical movement performed by a fighter aircraft during air combat maneuvering (also called ACM, or dogfighting) in order to gain a positional advantage over an opponent. BFMs combine the fundamentals of aerodynamic flight and the geometry of pursuit with the physics of managing the aircraft's energy-to-weight ratio, called its specific energy. When a neighbor traffic is moving in a direction not indicated by the heading, and/or performing one of these BFMs (collectively referred to herein as traffic maneuvers and as latitude-longitude "latlon" maneuvers), not only are the conventional display methods inadequate, but traffic data received from the traffic generally fails to provide all of the information that the ownship needs to adequately address the traffic maneuvers.

Accordingly, technologically advanced systems and methods for displaying traffic information are desirable. The desired system detects traffic maneuvers in which heading and direction of movement vary. The desired system represents detected traffic maneuvers on a display in an intuitive manner to indicate the traffic maneuver to the pilot. As a functional result, the desired system increases pilot response time and safety and improves the human-machine interface in the cockpit. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a method for detecting, by a vehicle, traffic maneuvers, is provided. The method includes: at a control module comprising a processor programmed with a traffic maneuvers program, perform the operations of: initializing a traffic maneuver program; receiving navigational data for the vehicle; receiving current traffic information for a neighbor traffic, the traffic information comprising a traffic identification, a position, a pitch, a roll, a altitude, a speed, a distance, and a heading; referencing the traffic information to thereby create neighbor traffic thresholds including a maximum latitudinal threshold, a maximum longitudinal threshold, a maximum altitude threshold, a maximum pitch, and a maximum roll; monitoring the traffic information until a default time elapses, to thereby determine a delta latitudinal position, a delta longitudinal position, a delta altitude, a delta pitch, and a delta roll, of the neighbor traffic during the default time; and when the default time elapses, identifying a traffic maneuver upon the occurrence of one or more of (i) the delta latitudinal position of the neighbor traffic during the default time exceeded the maximum latitudinal threshold, and (ii) the delta longitudinal position of the neighbor traffic during the default time exceeded the maximum longitudinal threshold, (iii) the delta altitude of the neighbor traffic during the default time exceeded the magnitude of the maximum altitude threshold; and generating display commands for a display system to render an enhanced symbolic indicator of the traffic maneuver on a map image; and at a display system, rendering the enhanced symbolic indicator of the traffic maneuver responsive to the display commands.

Another embodiment is a system for an aircraft for detecting traffic maneuvers, including: a source of navigation data for the aircraft; a source of traffic information for a neighbor traffic, the traffic information comprising a traffic identification, a position, a pitch, a roll, a altitude, a speed, a distance, a heading, and a track; a display system; and a processor programmed with a traffic maneuvers program, to: receive the navigational data; receive the traffic information for the neighbor traffic; create neighbor traffic thresholds including a maximum latitudinal threshold, a maximum longitudinal threshold, a maximum altitude threshold, a maximum pitch, and a maximum roll; monitor the traffic information until a default time elapses, to thereby determine a delta latitudinal position, a delta longitudinal position, a delta altitude, a delta pitch, and a delta roll, of the neighbor traffic during the default time; and when the default time elapses, identify a traffic maneuver upon the occurrence of one or more of (i) the delta latitudinal position of the neighbor traffic during the default time exceeded the maximum latitudinal threshold, (ii) the delta longitudinal position of the neighbor traffic during the default time exceeded the maximum longitudinal threshold, and (iii) the delta altitude of the neighbor traffic during the default time exceeded the magnitude of the maximum altitude threshold; and generate display commands for rendering an enhanced symbolic indicator of the traffic maneuver on a map image; and the display system rendering the enhanced symbolic indicator of the traffic maneuver responsive to the display commands.

Also provided is a method for detecting traffic maneuvers for use in an aircraft, including: at a processor programmed with a traffic maneuvers program, perform the operations of: receiving navigational data for the aircraft; receiving traffic information for a neighbor traffic, the traffic information comprising a traffic identification, a position, a pitch, a roll, a altitude, a speed, a distance, a heading, and a track; creating, based on the traffic information, neighbor traffic thresholds including a maximum latitudinal threshold, a maximum longitudinal threshold, a minimum latitudinal threshold, a minimum longitudinal threshold, a maximum altitude, a minimum altitude, a maximum pitch, a maximum roll, and a default time; monitoring the traffic information until the default time elapses, to thereby determine a delta latitudinal position, a delta longitudinal position, a delta altitude, a delta pitch, and a delta roll, of the neighbor traffic during the default time; and when the default time elapses, identifying a traffic maneuver upon the occurrence of one or more of (i) the delta latitudinal position of the neighbor traffic during the default time exceeded the maximum latitudinal threshold, (ii) the delta longitudinal position of the neighbor traffic during the default time exceeded the maximum longitudinal threshold, and (iii) the delta altitude of the neighbor traffic during the default time exceeded the magnitude of the maximum altitude threshold; and generating display commands for a display system to render an enhanced symbolic indicator of the traffic maneuver on a map image, the enhanced symbolic indicator being a triangular or circular movement indicator that is smaller and completely contained within a triangle used to represent the neighbor traffic; and at a display system, rendering the enhanced symbolic indicator of the traffic maneuver responsive to the display commands.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

Figure 1:
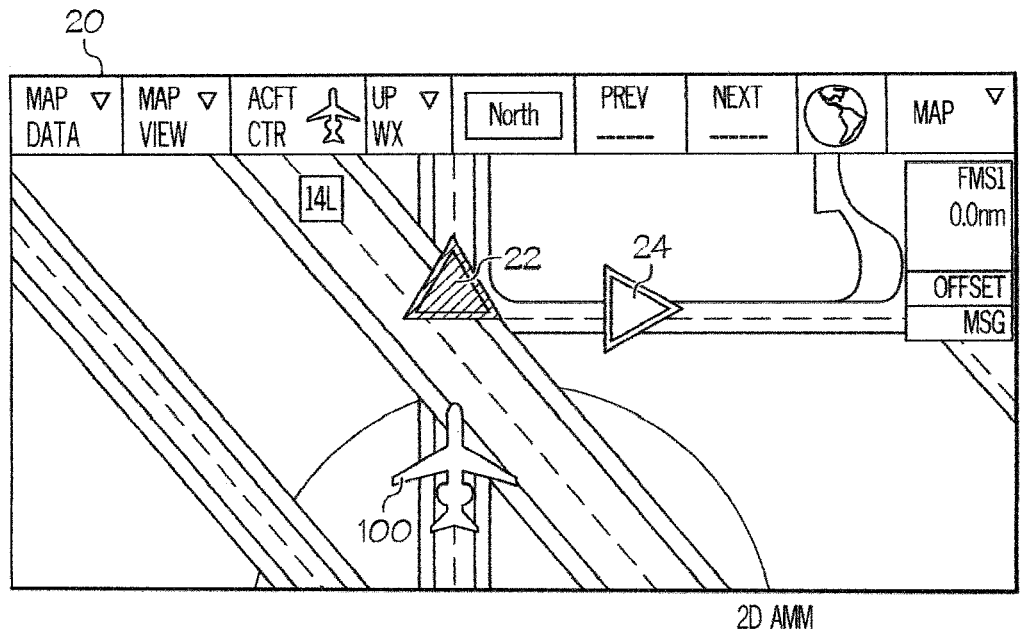
FIGS. 1-2 depict prior art two- and three-dimensional airport moving map images showing neighbor traffic headings.
Figure 2:
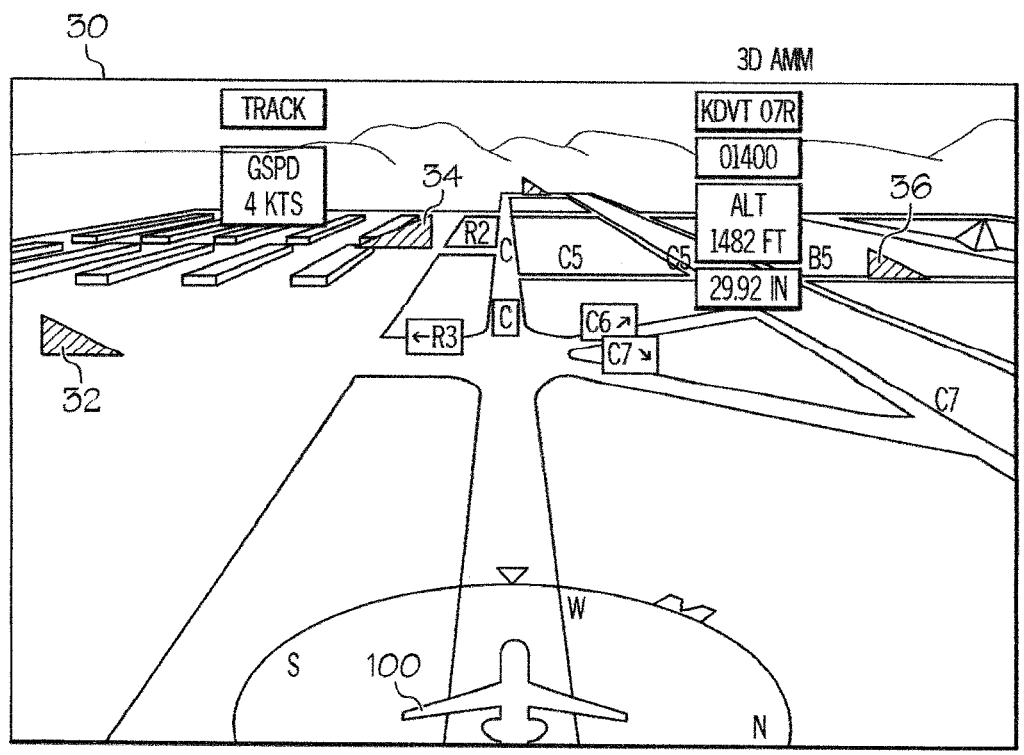
Figure 3:
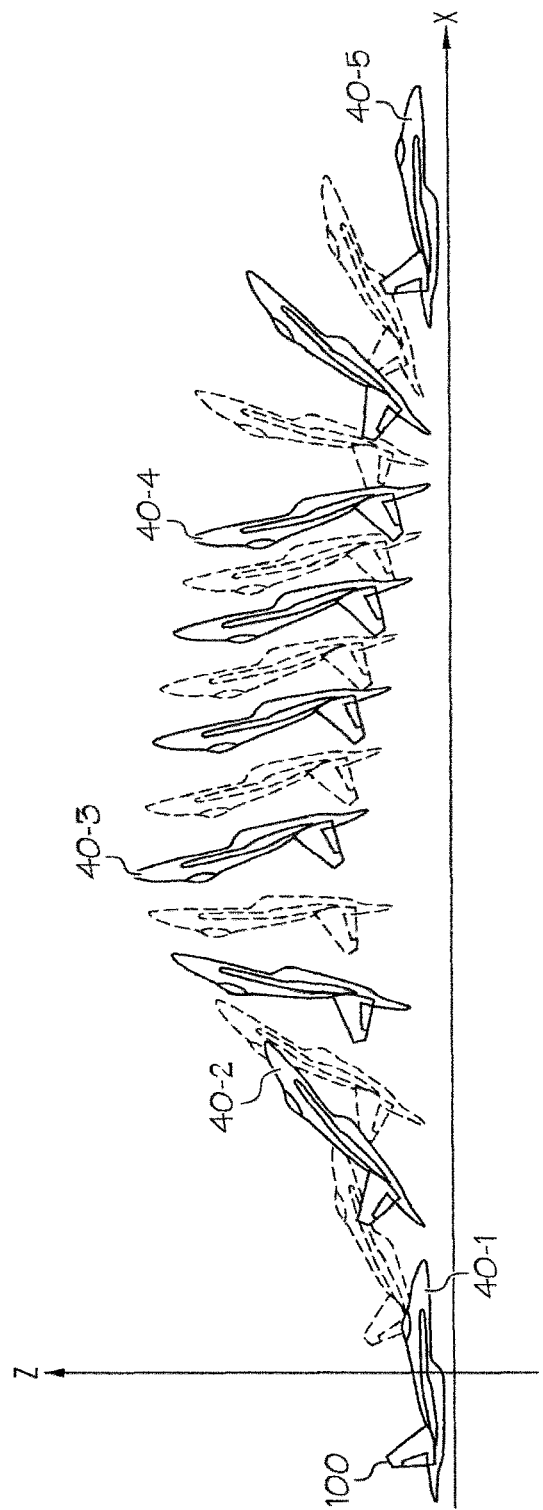
FIGS. 3, 4A, 4B, 4C, and 4D depict a variety of traffic maneuvers in which a heading varies from a direction of movement, in accordance with various exemplary embodiments.
Figure 4A:
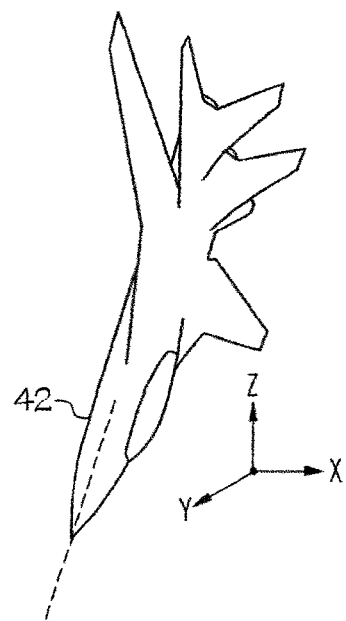
Figure 4B:
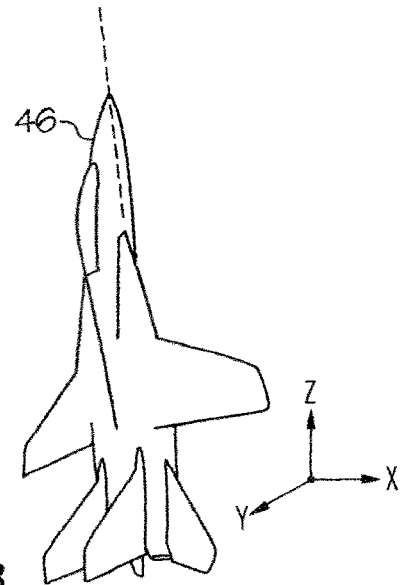
Figure 4C:
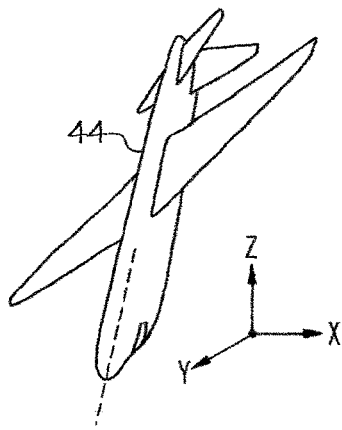
Figure 4D:
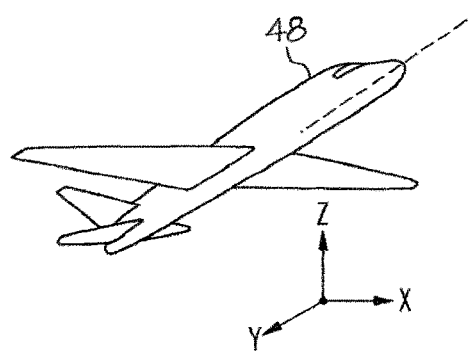

FIGS. 1-2 show how traffic is rendered on some conventional prior art displays. A symbolic icon is rendered on the displayed map image at a location that represents location with respect to the ownship. The heading of the traffic is intuitively conveyed by the shape of the symbolic icon (i.e., a triangle) that is oriented to point in the direction of the heading. The example image in FIG. 1 is a two-dimensional airport moving map (AMM) 20 with north at the top, showing ownship 100 on a path heading north along a taxiway, with traffic 22 and traffic 24 nearby. Traffic 22 is in front of the ownship 100 and has a heading similar to ownship 100, as is indicated by a triangle with a point pointing north. Traffic 24 is also depicted with a triangle, it is shown on a taxiway approximately perpendicular to the taxiway that the ownship 100 is on, having a heading approximately 90 degrees to the right from that of the ownship 100. In the example of FIG. 2, a three-dimensional AMM 30 shows ownship 100 on a path heading straight forward along a taxiway, with traffic 32, traffic 34, and traffic 36 nearby. As is indicated by the orientation of the triangles used for the traffic: Traffic 32 is heading toward the path that the ownship 100 is on, and traffic 34 and traffic 36 are each heading away from the path that the ownship 100 is on.

As mentioned, a neighbor traffic may be moving in a direction not indicated by the heading. With reference to FIGS. 3 and 4A, 4B, 4C, and 4D, some examples of these traffic maneuvers are illustrated. Traffic may assume a variety of orientations in three dimensions (aircraft 100 level with nose 40-1 along the x axis (or xy plane), aircraft with nose lifting up along z axis 40-2, nose up in z axis and behind tail in x axis 40-3, and nose coming back down toward x axis in 40-4 and 40-5; nose down and sideways 42, nose down 44, nose up 46, traffic on its side 48). Example latlon maneuvers include: a traffic moving sideways, a traffic moving in a reverse direction, a traffic moving upwards (in altitude) with a nose up, and a traffic moving downward (in altitude) with a nose down. Additionally, some jets and rotorcraft can employ a vertical takeoff, and/or hover. In some embodiments, hovering is a subset case of the latlon maneuvers. In other embodiments, hovering is distinguished as a separate traffic maneuver.

Each individual occurrence of conventionally available traffic data is usually a snapshot of information about a specific traffic provided by at least one of: an Automatic Dependent Surveillance-Broadcast (ADS-B); a Traffic Information Services-Broadcast (TIS-B); an onboard Traffic Collision and Avoidance System (TCAS); a radio altitude sensor, inertial reference system (IRS); an altitude and heading reference system (AHRS); and, etc. A plurality of neighbor traffic has an associated plurality of respective traffic data. Traffic data is described in more detail in connection with FIG. 5.

Currently, neither the conventionally available cockpit display, nor the conventionally available traffic data, can adequately address the detection and visual representation of latlon maneuvers. Therefore, a two-pronged technical problem is presented: (1) developing an optimal strategy for the detection of a latlon maneuver, and (2) developing an optimal strategy for visual representation of latlon maneuvers. The proposed exemplary embodiments provide a technical solution to two-pronged technical problem in the form of a control module (FIG. 5, 104) embodied as a processor programmed with novel rules and parameters that integrate multiple inputs to detect and alert a pilot to traffic performing a latlon maneuver. The figures and descriptions below provide more detail.

Figure 5:
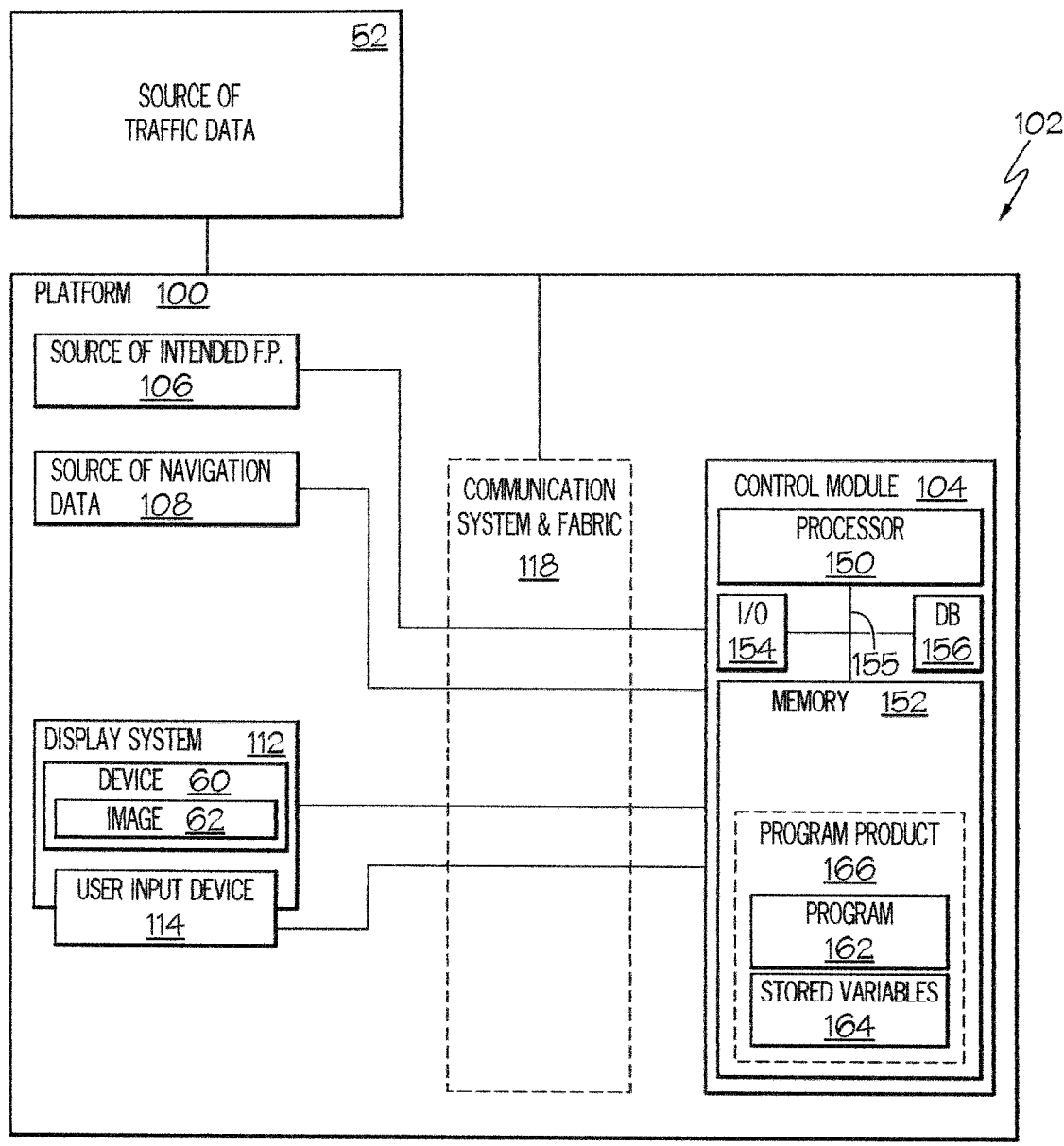
FIG. 5 is a block diagram of a system for detecting neighbor traffic maneuvers, in accordance with various exemplary embodiments.
Figure 6A:
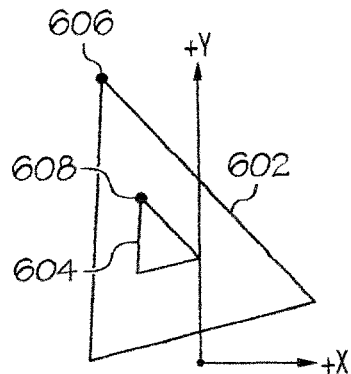
FIGS. 6a, 6b, 6c, 6d, and 7-9 are images depicting the display of neighbor traffic maneuvers in which headings and direction of movement vary, in accordance with various exemplary embodiments.
Figure 6B:
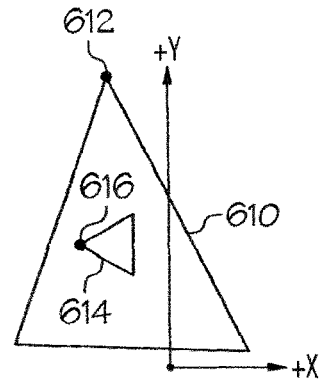
Figure 6C:
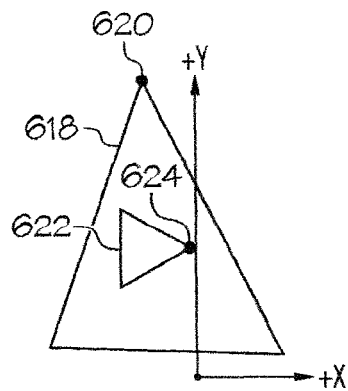
Figure 6D:
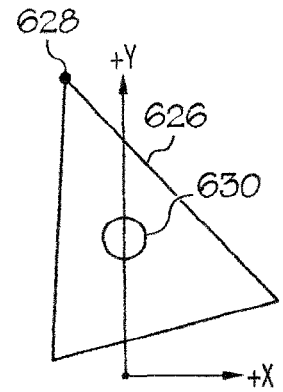

Turning now to FIG. 5, in an embodiment, a traffic maneuver detection system 102 (also referred to herein as "system" 102) is generally associated with a mobile platform 100, drone, or vehicle. In various embodiments, the mobile platform 100 is an aircraft, and is referred to as aircraft 100. The controlling component of the system 102 is the control module 104. In some embodiments, the control module 104 may be integrated within a preexisting mobile platform management system, avionics system, cockpit display system (CDS), flight controls system (FCS), or aircraft flight management system (FMS). Although the control module 104 is shown as an independent functional block, onboard the aircraft 100, in other embodiments, it may exist in an electronic flight bag (EFB) or portable electronic device (PED), such as a tablet, cellular phone, or the like. In embodiments in which the control module is within an EFB or a PED, a display system 112 and user input device 114 may also be part of the EFB or PED.

The control module 104 may be operationally coupled to any combination of the following aircraft systems: a source of an intended flight path 106, such as a navigation database (NavDB); a source of real-time aircraft navigation data 108, such as a navigation system; at least one source of current traffic data 52; and, a display system 112. In various embodiments, a communication system and fabric 118 may be employed to interface the aircraft systems. Additionally, the system 102 may include a user input device 114. The functions of these aircraft systems, and their interaction, are described in more detail below.

An intended flight path may include a series of intended geospatial midpoints between a departure and an arrival, as well as performance data associated with each of the geospatial midpoints (non-limiting examples of the performance data include intended navigation data, such as: intended airspeed, intended altitude, intended acceleration, intended flight path angle, and the like). As such, the intended flight path may be part of an operational flight plan (OFP). A source of the intended flight path 106 may be a storage location or a user input device. In various embodiments, a navigation database, NavDB, is the source of the active trajectory or OFP. The NavDB is generally a storage location that may also maintain a database of flight plans, and/or information regarding terrain and airports and/or other potential landing locations (or destinations) for the aircraft 100.

Real-time aircraft navigation data may include any of: an instantaneous location (e.g., the latitude, longitude, orientation), an instantaneous heading (i.e., the direction the aircraft is traveling in relative to some reference), a flight path angle, a vertical speed, a ground speed, an instantaneous altitude (or height above ground level), and a current phase of flight of the aircraft 100. As used herein, "real-time" is interchangeable with current and instantaneous. In some embodiments, the real-time aircraft navigation data is generated by a navigation system. The navigation system may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of a flight management system (FMS), as will be appreciated in the art. In various embodiments, the data referred to herein as the real-time aircraft navigation data may be referred to as state data. The real-time aircraft navigation data is made available, generally by way of the communication system and fabric 118, so other components, such as the control module 104 and the display system 112, may further process and/or handle the aircraft state data.

As mentioned above, current traffic data generally provides the control module 104 with a snapshot of aircraft-specific traffic information for one or more traffic around an ownship at any given time. The real-time traffic information may include: an instantaneous position (e.g., the latitude, longitude, orientation), an instantaneous heading (i.e., the direction the traffic is traveling in relative to some reference), a flight path angle, a vertical speed, a ground speed, an instantaneous altitude (or height above ground level), an aircraft track, drift, flight path angle, a current phase of flight of the traffic, inertial side slip, and etc. Also as mentioned above, the source of traffic data 52 may be one or more of: an Automatic Dependent Surveillance-Broadcast (ADS-B); a Traffic Information Services-Broadcast (TIS-B); an onboard Traffic Collision and Avoidance System (TCAS); and etc.

In various embodiments, a communications system and fabric 118 is configured to support instantaneous (i.e., real time or current) communications between on-board systems (i.e., the source of the intended flight path 106, the source of aircraft navigation data 108, and the display system 112), the control module 104, and one or more external data source(s), such as the source of current traffic data 52. As a functional block, the communications system and fabric 118 represents one or more transmitters, receivers, and the supporting communications hardware and software required for components of the system 102 to communicate as described herein. In various embodiments, the communications system and fabric 118 may have additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communications system and fabric 118 also support the herein referenced controller pilot data link communications (CPDLC), such as through an aircraft communication addressing and reporting system (ACARS) router; in various embodiments, this feature may be referred to as a communications management unit (CMU) or communications management function (CMF). In summary, the communications system and fabric 118 may allow the aircraft 100 and the control module 104 to receive information that would otherwise be unavailable to the pilot and/or co-pilot using only the onboard systems.

The user input device 114 and the control module 104 may be cooperatively configured to allow a user (e.g., a pilot, co-pilot, or crew member) to interact with display devices 60 in the display system 112 and/or other elements of the system 102. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 112. As used herein, the user input device 114 may be used by a pilot to communicate with external sources, such as ATC, to modify or upload the program product 166, etc. In various embodiments, the display system 112 and user input device 114 are onboard the aircraft 100 and are also operationally coupled to the communication system and fabric 118. In some embodiments, the control module 104, user input device 114, and display system 112 are configured as a control display unit (CDU).

In various embodiments, the control module 104, alone, or as part of a central management computer (CMS) or a flight management system (FMS), draws upon data and information from the source of intended flight path 106 and source of aircraft navigation data 108 to provide real-time flight guidance for aircraft 100. The real time flight guidance may be provided to a user by way of images 62 on the display system 112, audible emissions from an audio system, or the like. Images 62 may show the ownship and the environment surrounding the ownship, and additionally render relevant information thereon. For example, the control module 104 may compare an instantaneous position and heading of the aircraft 100 with the operational flight plan data for the aircraft 100 and generate display commands to render images 62 showing these features and distinguishing them from each other. The control module 104 may further provide flight guidance responsive to associating a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the intended flight plan for the aircraft 100.

The control module 104 may be said to display various images and selectable options described herein. In practice, this may mean that the control module 104 generates display commands. The control module 104 may perform display processing methods and graphics processing methods to thereby generate display commands for the display system 112 to cause the display device 60 to render thereon the image 62. Display processing methods include various formatting techniques for visually distinguishing objects and routes from among other similar objects and routes. Graphics processing methods may include various types of computer-generated symbols, text, and graphic information representing, for example, pitch, heading, flight path, airspeed, altitude, runway information, waypoints, targets, obstacles, terrain, and required navigation performance (RNP) data in an integrated, multi-color or monochrome form.

The display system 112 is configured to continuously receive and process the display commands from the control module 104. Responsive to the display commands, the display system 112 renders image 62 comprising various pictorial images, symbolic indicators, alerts, graphical user interface elements, tables, menus, and buttons, as described herein. The display system 112 includes a display device 60 for presenting the image 62. Currently, in-air traffic around an ownship is usually displayed in the ownship cockpit in an image 62 that is a lateral view, such as, on a horizontal situation indicator (HIS) or interactive navigation (INAV) display found on a multi-function display (MFD), and/or the image 62 may be displayed in a perspective view on a synthetic vision system (SVS). Similarly, on-ground traffic may be displayed in the cockpit in more than one kind of image. Perspective view images 62 of on-ground traffic may be provided by a three-dimensional Airport Moving Map (3D AMM); and, lateral (top-down) view images of on-ground traffic may be provided by a two-dimensional Airport Moving Map (2D AMM). Accordingly, in various embodiments described herein, the display system 112 includes a synthetic vision system (SVS). In exemplary embodiments, the display device 60 is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 5, an embodiment of the control module 104 is depicted as an enhanced computer system comprising a processor 150 and a memory 152. The processor 150, when programmed with traffic maneuver program 162, performs the operations and functions attributed to the control module 104 and the system 102.

The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Information in the memory 152 may be organized and/or imported from an external source during an initialization step of a process; it may also be programmed via a user input device 114. In some embodiments, a database 156 is part of the memory 152. In various embodiments, the database 156 has airport features data and terrain features data stored within it.

The novel traffic maneuver program 162 may be stored in the memory 152. Novel program 162 includes rules and instructions which, when executed by the processor, cause the control module to perform the functions, techniques, and processing tasks associated with the operation of the system 102. Novel program 162 and associated stored variables 164 may be stored in a functional form on computer readable media, for example, as depicted, in memory 152. While the depicted exemplary embodiment of the control module 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 118. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 118 and obtains data from external data source(s) directly. Also, in various embodiments, the I/O interface 154 may support communication with technicians, and/or one or more storage interfaces for direct connection to storage apparatuses, such as the database 156.

Having described the functional blocks, we now move to the operation of the system 102. The novel traffic maneuver detection system 102 introduces an optimal strategy for visual representation of traffic maneuvers for the pilot. FIGS. 6a, 6b, 6c, 6d, and 7-9 depict various embodiments of enhanced symbolic "indicators" for traffic doing a traffic maneuver that the processor 150 may generate and render on an image 62. When the neighbor traffic is moving sideways, in reverse, or hovering, the processor 150 identifies this traffic maneuver as a two-dimensional latlon maneuver. The processor 150 renders an enhanced symbolic indicator for the two-dimensional latlon maneuver that conveys the location of the traffic and visually represents details of its two-dimensional traffic maneuver. The enhanced symbolic indicator begins with a triangle (herein referred to as the traffic triangle and/or the traffic indicator) to demark the traffic location and indicate the heading of the traffic; the enhanced symbolic indicator further adds information for the pilot by generating a unique "movement indicator" for each neighbor traffic. In each example embodiment, the movement indicator is smaller and completely contained within the traffic triangle. When the processor 150 determines that the traffic is moving in a determined direction, the movement indicators are triangles oriented to show a direction of movement.

For example, traffic indicator 602 is a triangle oriented with point 606 indicating the current heading. Movement indicator 604 is also a triangle, has a directional point 608 indicating a direction of movement that is consistent with the traffic heading, and movement indicator 604 fits entirely within traffic indicator 602. In other embodiments, when processor 150 determines that the movement is consistent with the heading, the movement indicator may be omitted (see, for example, FIG. 7, traffic 702).

Traffic indicator 610 is a triangle oriented with point 612 indicating the current heading. Movement indicator 614 is also a triangle, has a directional point 616 indicating a direction of movement that is toward the left, or approximately 90 degrees counter-clockwise from the traffic heading; movement indicator 614 fits entirely within traffic indicator 610. Traffic indicator 618 is a triangle oriented with point 620 indicating the current heading. Movement indicator 622 is also a triangle, has a directional point 624 indicating a direction of movement that is toward the right, or approximately 90 degrees clockwise from the traffic heading; movement indicator 622 fits entirely within traffic indicator 618.

When the processor 150 determines that the traffic is hovering, a movement indicator that does not have a directional point is used. For example, traffic indicator 626 is a triangle oriented with point 628 indicating the current heading, as before. In various embodiments, movement indicator 630 is a circle or dot, indicating a null set, or no direction of movement; as before, movement indicator 630 fits entirely within traffic indicator 626.

Figure 7:
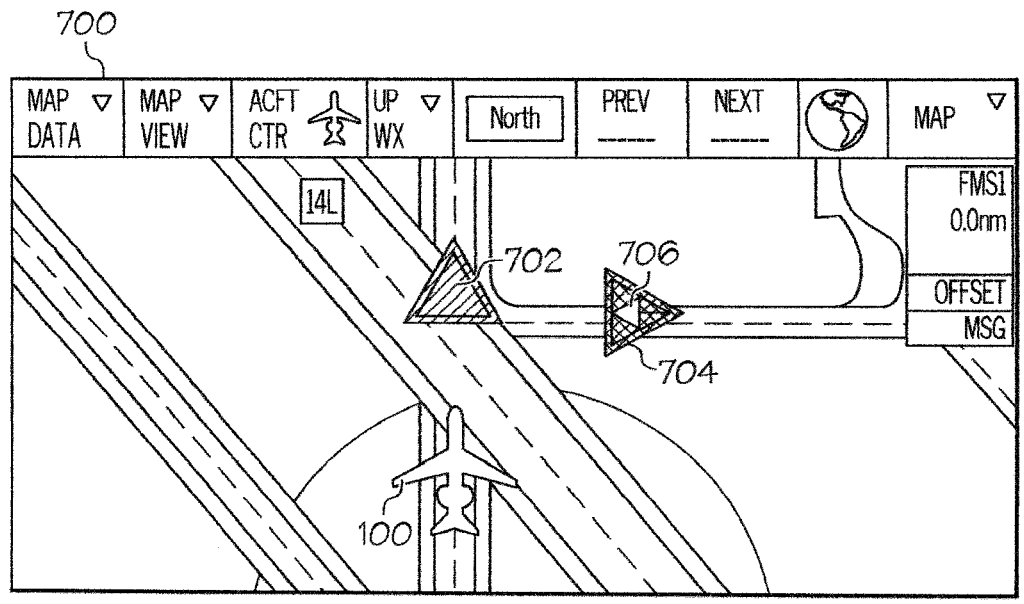
Figure 8:
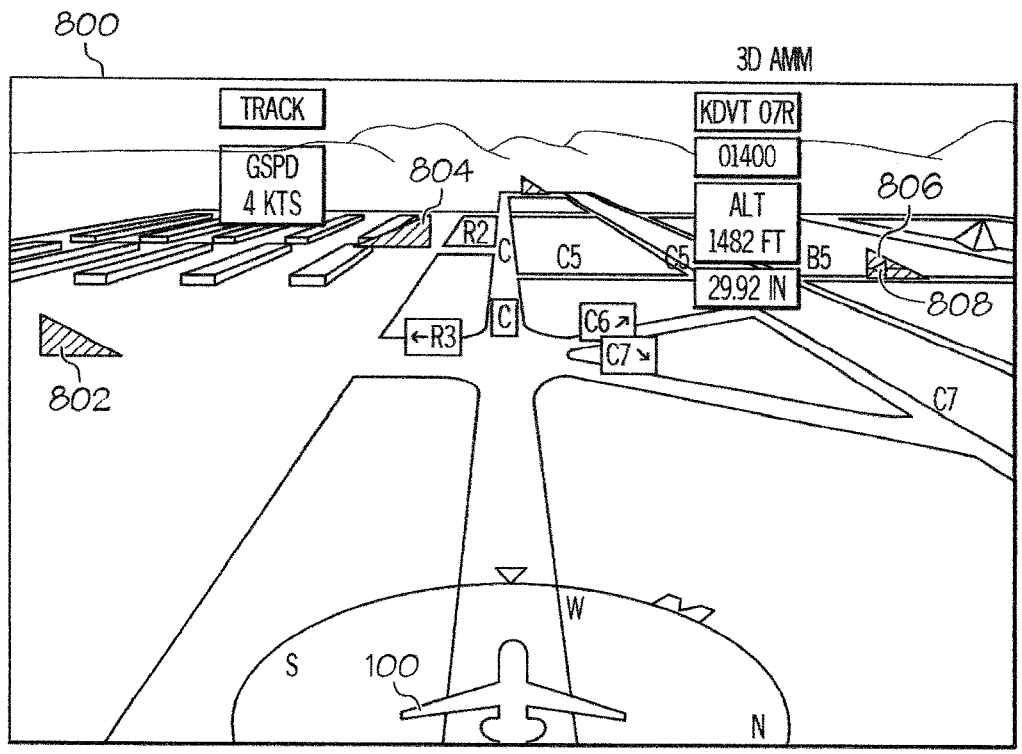
Figure 9:
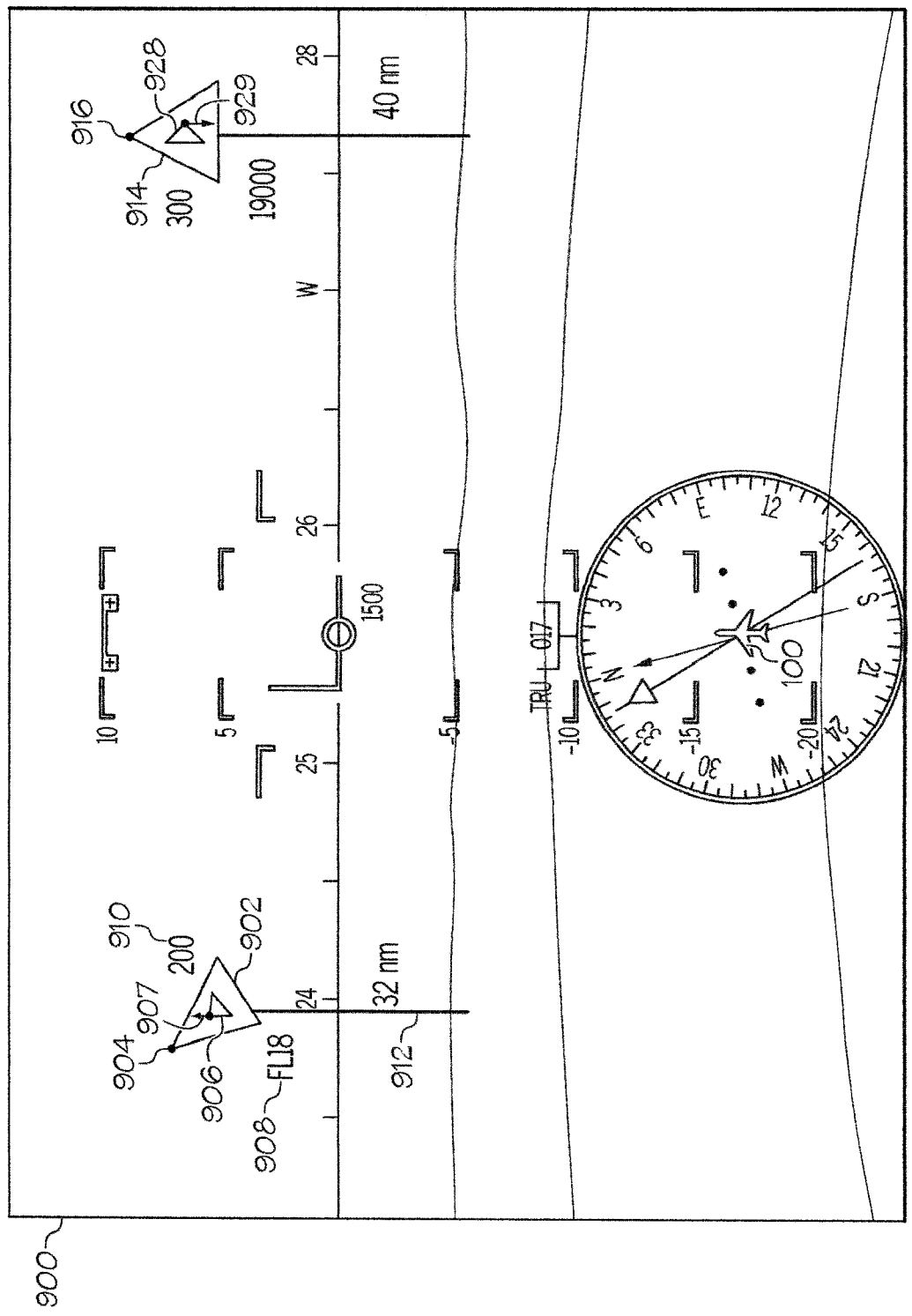

In various embodiments, on-ground traffic may be depicted slightly differently in the two-dimensional AMMs and the three-dimensional AMMs, as shown in FIGS. 7, 8, and 9. In 2D AMM image 700, traffic 702 is directly in front of ownship 100, as was the case in FIG. 1. However, traffic 704, with its heading pointing away from the center of the image, has been identified by the processor 150 as moving in a reverse direction from its heading. Movement indicator 706 is rendered within the traffic 704 triangle. Movement indicator 706 is a triangle pointed in the opposite direction of the heading of traffic 704.

The three-dimensional AMM 800 shows ownship 100 heading straight forward along a taxiway, with traffic 802, traffic 804, and traffic 806 nearby. In various embodiments, traffic triangles may be right triangles, as shown in FIG. 8, rather than equilateral triangles as shown in FIG. 7, but they still convey heading information the same way. As is indicated by the orientation of the triangles used for the traffic: Traffic 802 is heading toward the path that the ownship 100 is on, and traffic 804 and traffic 806 are each heading away from the path that the ownship 100 is on. However, the processor has determined that traffic 806 is moving toward the path that the ownship 100 is on, therefore, a movement indicator 808 with a directional point toward the path that the ownship 100 is on is shown inside the traffic 806 indicator.

In FIG. 9, a three-dimensional synthetic vision image 900 depicts an in-air traffic scenario, in accordance with an exemplary embodiment. When the processor 150 determines that the neighbor traffic is moving in altitude (i.e., vertical movement, or movement in the Z axis), a three-dimensional latlon maneuver is identified. The enhanced symbolic indicator for the three-dimensional latlon maneuver builds upon the two-dimensional latlon indicator by adding an up arrow or down arrow, placed inside the traffic indicator triangle and attached to the directional point of the movement indicator, as shown in FIG. 9. A traffic 902 triangle is rendered at the traffic location and oriented to indicate a heading with point 904. The processor 150 has monitored the traffic 902 and determined that the delta lateral position and delta longitudinal position of the traffic 902 do not exceed a maximum latitudinal threshold or a maximum longitudinal threshold and therefore the 2-dimensional, i.e., latlon, movement of the traffic 902 is in alignment with its heading. The processor 150 renders the neighbor traffic with a latlon movement indicator 906 aligned with the heading. However, the processor 150 has also determined that a delta altitude of the traffic 902 has exceeded the magnitude of a maximum altitude threshold (upward direction), and therefore embellished the movement indicator 906 with an upward arrow 907 to indicate vertical movement exceeding the altitude threshold. Therefore, the complete movement indicator for traffic 902 visually conveys three-dimensional information. In various embodiments, the processor 150 additionally provides in the rendering of traffic 902, one or more of: a height above ground 908, a traffic speed 910, and a relative distance 912 from the ownship to the traffic 902.

Applying the same analysis to traffic 914, the following visual information is conveyed for traffic 914. The processor 150 has monitored the traffic 914 and determined that the delta lateral position and delta longitudinal position of the traffic 902 exceed a maximum latitudinal threshold and/or a maximum longitudinal threshold and therefore the 2-dimensional, i.e., latlon, movement of the traffic 914 movement is to the right by about 90 degrees, which is inconsistent with the heading 916. The processor 150 renders the neighbor traffic 914 with a latlon movement indicator 928 pointing to the right. However, the processor 150 has also determined that a delta altitude of the traffic 902 has exceeded the magnitude of the maximum altitude threshold in the negative/downward direction, and therefore embellished the movement indicator 928 with downward arrow 929 to indicate vertical movement exceeding the altitude threshold. Therefore, the complete movement indicator for traffic 914 visually conveys three-dimensional information.

Figure 10:
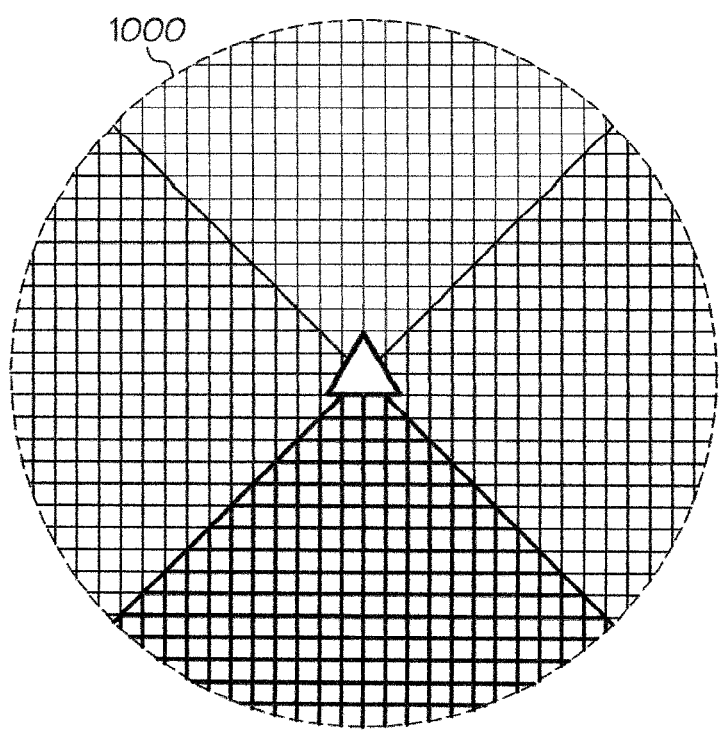
FIGS. 10-12 depict a method for detecting neighbor traffic maneuvers, in accordance with various exemplary embodiments.
Figure 11:
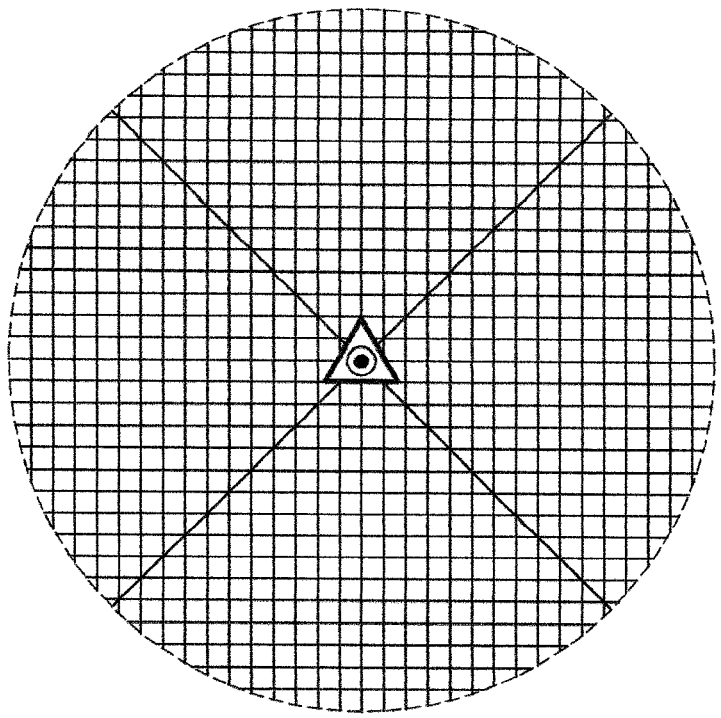
Figure 12:
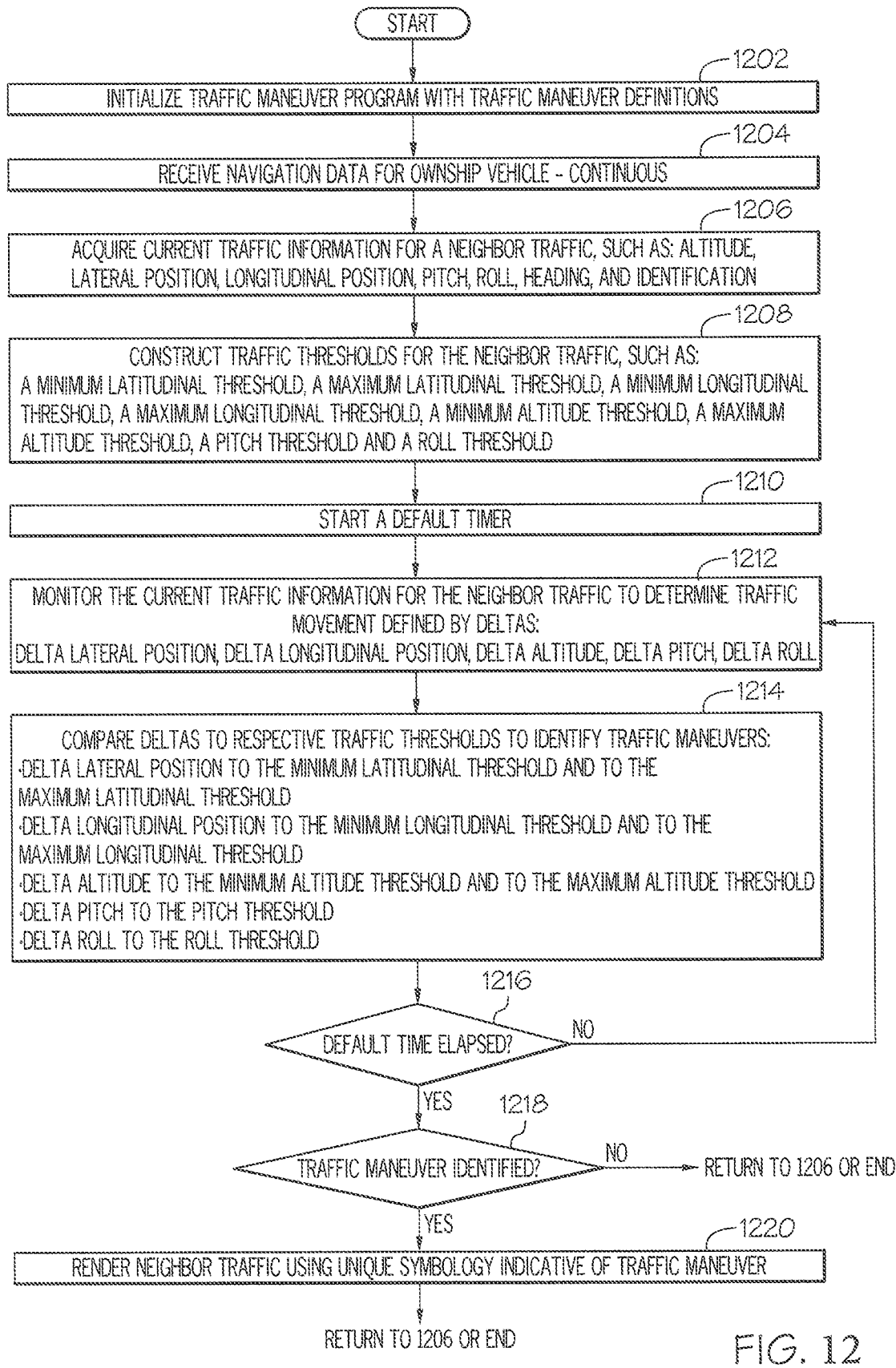

The system 102 also introduces an optimal strategy for the detection of the two- and three-dimensional traffic maneuvers. In FIGS. 10-12, a method 1200 for detecting, by a vehicle (such as ownship 100), neighbor traffic maneuvers, is described. At initialization (1202), processor 150 is programmed with the traffic maneuver program 162, and then begins executing the instructions embodied in the traffic maneuver program 162. At 1204, the processor performs the operation of receiving navigational data for the vehicle 100; this is understood to be continuous. The display system 112 may utilize the ownship navigational data to render current views in images 62 based at least in part on the navigational data for the vehicle 100. At operation 1206, the processor 150 receives traffic information for a neighbor traffic. In various embodiments, the traffic information may comprise: a traffic identification, a position (latitudinal and longitudinal), orientation (roll, pitch), aircraft track, speed, altitude, distance from ownship, drift, flight path angle, a current phase of flight of the traffic, a heading, an inertial side slip, etc. In various embodiments, at 1206, the processor 150 receives, for each of a plurality of traffic, respective traffic information.

At operation 1208, the processor 150 constructs, for that specific neighbor traffic, neighbor traffic thresholds. In various embodiments, the neighbor traffic thresholds include a maximum latitudinal threshold, and a maximum longitudinal threshold. In other embodiments, the neighbor traffic thresholds include a maximum latitudinal threshold, a maximum longitudinal threshold, a minimum latitudinal threshold, and a minimum longitudinal threshold. Minimum thresholds are used to determine hovering traffic maneuvers. In other embodiments, the neighbor traffic thresholds include a maximum latitudinal threshold, a maximum longitudinal threshold, a minimum latitudinal threshold, and a minimum longitudinal threshold, a minimum altitude threshold, a maximum altitude threshold, a pitch threshold, and a roll threshold.

In various embodiments, at 1308, the processor 150 further determines a default time. The default time, for use in a default timer, is a measure of time over which the specific element of current traffic information is monitored; and, traffic movement is defined by changes in that specific traffic information over that default time. In various embodiments, there is more than one element of traffic information to be monitored, and each has a respective default time, and each of the default times are associated with a respective threshold. In still other embodiments, the default time is preprogrammed and stored in memory. The thresholds and default time together are often a function of typical behavior for normal operations of the specific type of aircraft that constitutes the neighbor traffic. In creating the thresholds and the default time, the program 162 may reference aircraft-specific information such as an aircraft type and associated flight specifications such as speed, size, and weight. For example, a jet would be expected to cover more distance than a rotorcraft in the same amount of time. Accordingly, the thresholds (and default time) for a first neighbor traffic may differ from the thresholds (and default time) for a second neighbor traffic. In some embodiments, one or more of the thresholds is preprogrammed and stored in memory.

The thresholds may be used to create an area 1000 around the neighbor traffic that is bounded by the maximum latitudinal threshold and the maximum longitudinal threshold. In FIG. 10 and FIG. 11, the area 1000 is depicted as a circle, when viewed from directly above the neighbor traffic, however, the area 1000 does not have to be a circle. The area 1000 can then be partitioned into quadrants in an XY plane. Using area 1000, the processor 150 determines that traffic movement is in reverse when traffic movement is detected in a quadrant behind the traffic, the bottom most quadrant on the page in FIG. 10. The processor 150 determines that the neighbor traffic is moving to the right by determining that the traffic movement is in a quadrant to the right of the neighbor traffic. The processor 150 determines that the neighbor traffic is moving to the left by determining that the traffic movement is in a quadrant to the left of the neighbor traffic.

In some embodiments, the area 1000 is rotated around the traffic heading axis in three dimensions to create a volume; in these embodiments, a separate altitude threshold is not necessary. In other embodiments, a volume is created around the traffic by using the area 100 in the XY plane and then extending in the +/− Z direction by the maximum altitude threshold. In three-dimensions, the processor 150 monitors not only the 2-dimensional latlon and hover maneuvers, but also monitors delta altitude, delta pitch, and delta roll. In FIGS. 10-11, the quadrants of area 1000 look like pie slices, but in three dimensions they would look more like orange slices.

At 1210, a default timer is set to the default time, and while the default time counts down, the processor 150 monitors the received current traffic information to determine traffic movement, defined by a delta in a specific element of the traffic information over time. In an example, the traffic movement is called a latlon, and is defined as a delta latitudinal movement and a delta longitudinal movement of a respective traffic (sometimes referred to as a neighbor traffic) during the default time. In various embodiments, at 1210, the processor 150 also monitors traffic movement as a delta altitude, a delta pitch, and a delta roll. In some embodiments, at 1210, the processor 150 also monitors traffic movement as delta aircraft track, delta drift, and delta flight path angle for the traffic. In some embodiments, at 1210, the processor 150 also monitors traffic movement as delta inertial side slip.

At 1214, and until the default time elapses, the deltas (i.e., traffic movements) are compared to their respective thresholds to identify traffic maneuvers. As mentioned previously, the traffic maneuvers are defined, at least in part, in the traffic maneuver program 162. A latlon traffic maneuver is defined as a delta lateral position exceeding the maximum lateral threshold and/or a delta longitudinal position exceeding the maximum longitudinal threshold. A three-dimensional traffic maneuver may be defined as a latlon traffic maneuver plus a delta altitude (i.e., delta vertical, or delta Z direction), either positive or negative, that exceeds the magnitude of the altitude threshold. A two-dimensional hover traffic maneuver is defined as the concurrence of (i) a delta lateral position being less than the minimum lateral threshold, and (ii) a delta longitudinal position being less than the minimum longitudinal threshold; and, a three-dimensional hover traffic maneuver is defined as, (i) and (ii) must also be concurrent with (iii) a delta altitude being less than the magnitude of a minimum altitude threshold. At 1214, the processor 150 may also compare the delta pitch to the pitch threshold and may compare the delta roll to the delta roll threshold.

In various embodiments, the delta longitudinal position and delta latitudinal position of the neighbor traffic during the default time is mapped onto an image of the area 1000 to indicate where a threshold has been exceeded. Quadrant 1002 is on the right, and traffic movement toward the right is detected within this quadrant 1002. Quadrant 1004 is behind the neighbor traffic, and traffic moving in the reverse is detected when the traffic movement is in quadrant 1004. Quadrant 1006 is on the left, and traffic moving to the left is detected when the traffic movement is in quadrant 1006. Quadrant 1008 is ahead of the neighbor traffic, and forward movement is detected when the traffic movement is in quadrant 1008. Testing for hovering (FIG. 11) utilizes all four quadrants and a minimum latitudinal threshold and a minimal longitudinal threshold. If the traffic moves less than the minimum latitudinal threshold and the minimal longitudinal threshold in all four quadrants during the default time, the processor 150 determines that it is hovering. In three-dimensional embodiments, the delta altitude and altitude thresholds may be mapped into a three-dimensional image.

At 1216, if the default time has not elapsed, the process may return to 1212.

At 1216, if the default time has elapsed, the processor 150 determines whether a traffic maneuver has been identified. In various two-dimensional embodiments, as long as delta longitudinal position and delta latitudinal position of the neighbor traffic during the default time does not exceed the area 1000 created by the thresholds, the thresholds are not exceeded, and the processor 150 determines that the traffic is traveling in accordance with expectation. In various three-dimensional embodiments, as long as none of the delta altitude, delta longitudinal position, and delta latitudinal position of the neighbor traffic during the default time has exceeded the volume created by the thresholds, the thresholds are not exceeded, and the processor 150 determines that the traffic is traveling in accordance with expectation.

Upon identifying a traffic maneuver, the processor 150 alerts the pilot to the traffic maneuver by causing the display system 112 to render an enhanced symbolic indicator at the location associated with the neighbor traffic, the enhanced symbolic indicator having the novel movement indicator therein to thereby convey the details of the traffic maneuver, as described in connection with FIGS. 6-9. As mentioned, the processor 150 may also be programmed to generate display commands for the display system 112 to further distinguish the enhanced symbolic indicator to indicate a pitch, roll, and distance of the neighbor traffic with respect to vehicle 100.

Thus, technologically improved systems and methods that display neighbor traffic, define thresholds for detecting traffic maneuvers by the neighbor traffic, monitor traffic movement with respect to the traffic thresholds, and render visual alerts in the form of enhanced symbolic icons are provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for detecting, by a vehicle, traffic maneuvers, comprising:
    at a control module comprising a processor programmed with a traffic maneuvers program, perform the operations of:
        initializing a traffic maneuver program;
        receiving navigational data for the vehicle;
        receiving current traffic information for a neighbor traffic, the traffic information comprising a traffic identification, a position, a pitch, a roll, an altitude, a speed, a distance, and a heading;
        referencing the traffic information to thereby create neighbor traffic thresholds including a maximum latitudinal threshold, a maximum longitudinal threshold, a maximum altitude threshold, a maximum pitch, and a maximum roll;
        monitoring the traffic information until a default time elapses, to thereby determine a delta latitudinal position, a delta longitudinal position, a delta altitude, a delta pitch, and a delta roll, of the neighbor traffic during the default time; and
    when the default time elapses,
        identifying a traffic maneuver upon the occurrence of one or more of (i) the delta latitudinal position of the neighbor traffic during the default time exceeded the maximum latitudinal threshold, and (ii) the delta longitudinal position of the neighbor traffic during the default time exceeded the maximum longitudinal threshold, (iii) the delta altitude of the neighbor traffic during the default time exceeded the magnitude of the maximum altitude threshold; and
        generating display commands for a display system to render an enhanced symbolic indicator of the traffic maneuver on a map image; and
    at a display system, rendering the enhanced symbolic indicator of the traffic maneuver responsive to the display commands.

2. The method of claim 1, wherein generating the enhanced symbolic indicator includes generating a movement indicator that is smaller and completely contained within a triangle used to represent the respective traffic.

3. The method of claim 2, further comprising:
    generating display commands for the display system to further distinguish the enhanced symbolic indicator to indicate the delta pitch, the delta roll, and a distance of the neighbor traffic from the vehicle.

4. The method of claim 2, further comprising,
    creating neighbor traffic thresholds including a minimum latitudinal threshold, a minimum longitudinal threshold, and a minimum altitude threshold; and
    when the default time elapses,
    identifying a hover traffic maneuver upon a concurrence of (i) the delta lateral position being less than the minimum lateral threshold, (ii) the delta longitudinal position being less than the minimum longitudinal threshold, and (iii) the delta altitude being less than a magnitude of the minimum altitude threshold.

5. The method of claim 4, further comprising:
    responsive to identifying a hover traffic maneuver,
        generating display commands for the display system to further distinguish the symbolic icon to indicate a pitch, a roll, and a distance of the neighbor traffic with respect to vehicle.

6. The method of claim 4, wherein the neighbor traffic is a first neighbor traffic, and the traffic information is the first traffic information; and further comprising:
    receiving a second traffic information for a second neighbor traffic;
    referencing the second traffic information to thereby create second neighbor traffic thresholds including a second delta latitudinal position, a second delta longitudinal position, and a second delta altitude;
    monitoring the second traffic information until a second default time elapses, to thereby determine a second delta latitudinal position, a second delta longitudinal position, a second delta altitude, a second delta pitch, and a second delta roll, of the neighbor traffic during the second default time; and when the second default time elapses,
identifying a second traffic maneuver upon the occurrence of one or more of (i) the second delta latitudinal position of the second neighbor traffic during the second default time exceeded the second maximum latitudinal threshold, (ii) the second delta longitudinal position of the second neighbor traffic during the second default time exceeded the second maximum longitudinal threshold, and (iii) the second delta altitude of the second neighbor traffic during the second default time exceeded the magnitude of the second maximum altitude threshold; and
generating display commands for a display system to render an enhanced symbolic indicator of the second traffic maneuver on a map image; and
at a display system, rendering the enhanced symbolic indicator of the second traffic maneuver responsive to the display commands.

7. The method of claim 4, further comprising:
creating an area around the neighbor traffic that is bounded by the maximum latitudinal threshold and the maximum longitudinal threshold; and
partitioning the area into quadrants.

8. The method of claim 6 further comprising:
determining that the neighbor traffic is moving in reverse by determining that the traffic movement is in a quadrant behind the neighbor traffic.

9. The method of claim 7 further comprising:
determining that the neighbor traffic is moving to the right by determining that the traffic movement is in a quadrant to the right of the neighbor traffic.

10. The method of claim 7 further comprising:
determining that the neighbor traffic is moving to the left by determining that the traffic movement is in a quadrant to the left of the neighbor traffic.

11. A system for an aircraft for detecting traffic maneuvers, comprising:
a source of navigation data for the aircraft;
a source of traffic information for a neighbor traffic, the traffic information comprising a traffic identification, a position, a pitch, a roll, a altitude, a speed, a distance, a heading, and an aircraft track;
a display system; and
a processor programmed with a traffic maneuvers program, to:
receive the navigational data;
receive the traffic information for the neighbor traffic;
create neighbor traffic thresholds including a maximum latitudinal threshold, a maximum longitudinal threshold, a maximum altitude threshold, a maximum pitch, and a maximum roll;
monitor the traffic information until a default time elapses, to thereby determine a delta latitudinal position, a delta longitudinal position, a delta altitude, a delta pitch, and a delta roll, of the neighbor traffic during the default time; and
when the default time elapses,
identify a traffic maneuver upon the occurrence of one or more of (i) the delta latitudinal position of the neighbor traffic during the default time exceeded the maximum latitudinal threshold, (ii) the delta longitudinal position of the neighbor traffic during the default time exceeded the maximum longitudinal threshold, and (iii) the delta altitude of the neighbor traffic during the default time exceeded the magnitude of the maximum altitude threshold; and
generate display commands for rendering an enhanced symbolic indicator of the traffic maneuver on a map image; and
the display system rendering the enhanced symbolic indicator of the traffic maneuver responsive to the display commands.

12. The system of claim 10, wherein the processor is further programmed to:
generate display commands for rendering an enhanced symbolic indicator that is a movement indicator triangle enclosed within a traffic triangle.

13. The system of claim 12, wherein the processor is further programmed to:
create neighbor traffic thresholds including a minimum latitudinal threshold, a minimum longitudinal threshold, and a minimum altitude threshold; and
when the default time elapses,
identify a hover traffic maneuver upon a concurrence of (i) the delta lateral position being less than the minimum lateral threshold, (ii) the delta longitudinal position being less than the minimum longitudinal threshold, and (iii) the delta altitude being less than a magnitude of the minimum altitude threshold.

14. The system of claim 13, wherein the processor is further programmed to:
responsive to identifying a traffic maneuver,
generate display commands for the display system to further distinguish the enhanced symbolic indicator to indicate a pitch, a roll, and a distance of the neighbor traffic with respect to vehicle.

15. The system of claim 13, wherein the neighbor traffic is a first neighbor traffic, and the traffic information is the first traffic information; and wherein the processor is further programmed to:
receiving a second traffic information for a second neighbor traffic;
create second neighbor traffic thresholds including a second delta latitudinal position, a second delta longitudinal position, and a second delta altitude;
monitor the second traffic information until a second default time elapses, to thereby determine a second delta latitudinal position, a second delta longitudinal position, a second delta altitude, a second delta pitch, and a second delta roll, of the neighbor traffic during the second default time; and
when the second default time elapses,
identify a second traffic maneuver upon the occurrence of one or more of (i) the second delta latitudinal position of the second neighbor traffic during the second default time exceeded the second maximum latitudinal threshold, (ii) the second delta longitudinal position of the second neighbor traffic during the second default time exceeded the second maximum longitudinal threshold, and (iii) the second delta altitude of the second neighbor traffic during the second default time exceeded the magnitude of the second maximum altitude threshold; and
generate display commands for a display system to render an enhanced symbolic indicator of the second traffic maneuver on a map image; and
the display system further rendering the enhanced symbolic indicator of the second traffic maneuver responsive to the display commands.

16. The system of claim 14, wherein the processor is further programmed to:

create a volume around the neighbor traffic that is bounded by the maximum latitudinal threshold, the maximum longitudinal threshold, and the magnitude of the maximum altitude; and partition the volume into quadrants.

17. The system of claim 16, wherein the processor is further programmed to embellish the movement indicator with an upward arrow to indicate vertical movement exceeding the altitude threshold.

18. The system of claim 16, wherein the processor is further programmed to embellish the movement indicator with downward arrow to indicate vertical movement exceeding the altitude threshold.

19. The system of claim 17, wherein the processor is further programmed to:

determine that the neighbor traffic is moving to the left by determining that the traffic movement is in a quadrant to the left of the neighbor traffic.

20. A method for detecting traffic maneuvers for use in an aircraft, comprising:

at a processor programmed with a traffic maneuvers program, perform the operations of:

receiving navigational data for the aircraft;

receiving traffic information for a neighbor traffic, the traffic information comprising a traffic identification, a position, a pitch, a roll, a altitude, a speed, a distance, a heading, and an aircraft track;

creating, based on the traffic information, neighbor traffic thresholds including a maximum latitudinal threshold, a maximum longitudinal threshold, a minimum latitudinal threshold, a minimum longitudinal threshold, a maximum altitude, a minimum altitude, a maximum pitch, a maximum roll, and a default time;

monitoring the traffic information until the default time elapses, to thereby determine a delta latitudinal position, a delta longitudinal position, a delta altitude, a delta pitch, and a delta roll, of the neighbor traffic during the default time; and when the default time elapses, identifying a traffic maneuver upon the occurrence of one or more of (i) the delta latitudinal position of the neighbor traffic during the default time exceeded the maximum latitudinal threshold, (ii) the delta longitudinal position of the neighbor traffic during the default time exceeded the maximum longitudinal threshold, and (iii) the delta altitude of the neighbor traffic during the default time exceeded the magnitude of the maximum altitude threshold; and generating display commands for a display system to render an enhanced symbolic indicator of the traffic maneuver on a map image, the enhanced symbolic indicator being a triangular or circular movement indicator that is smaller and completely contained within a triangle used to represent the neighbor traffic, the enhanced symbolic indicator embellished with an arrow depicting vertical movement; and at a display system, rendering the enhanced symbolic indicator of the traffic maneuver responsive to the display commands.

\* \* \* \* \*